United States Patent Office 2,934,359
Patented Apr. 26, 1960

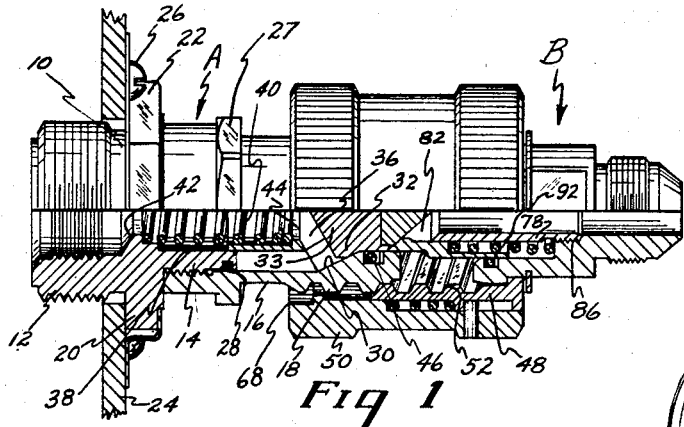
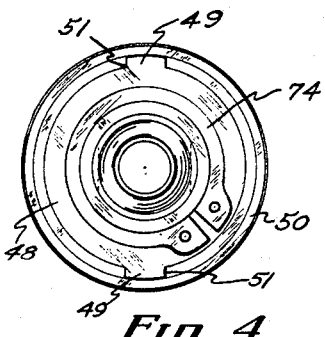
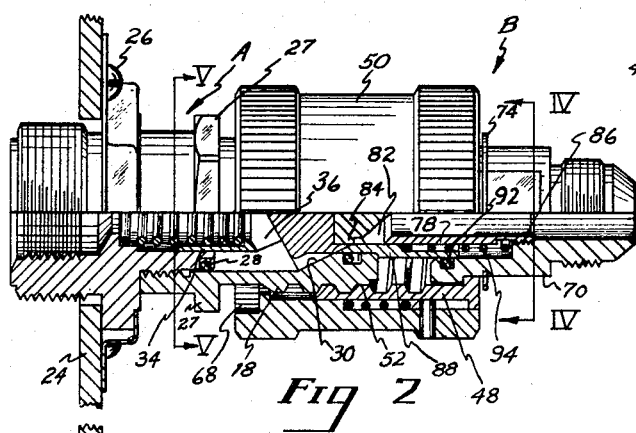
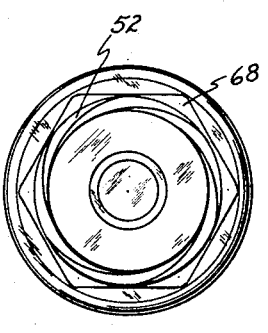
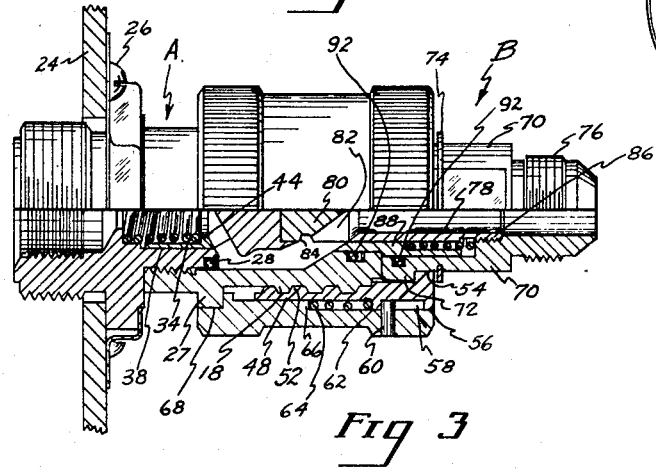

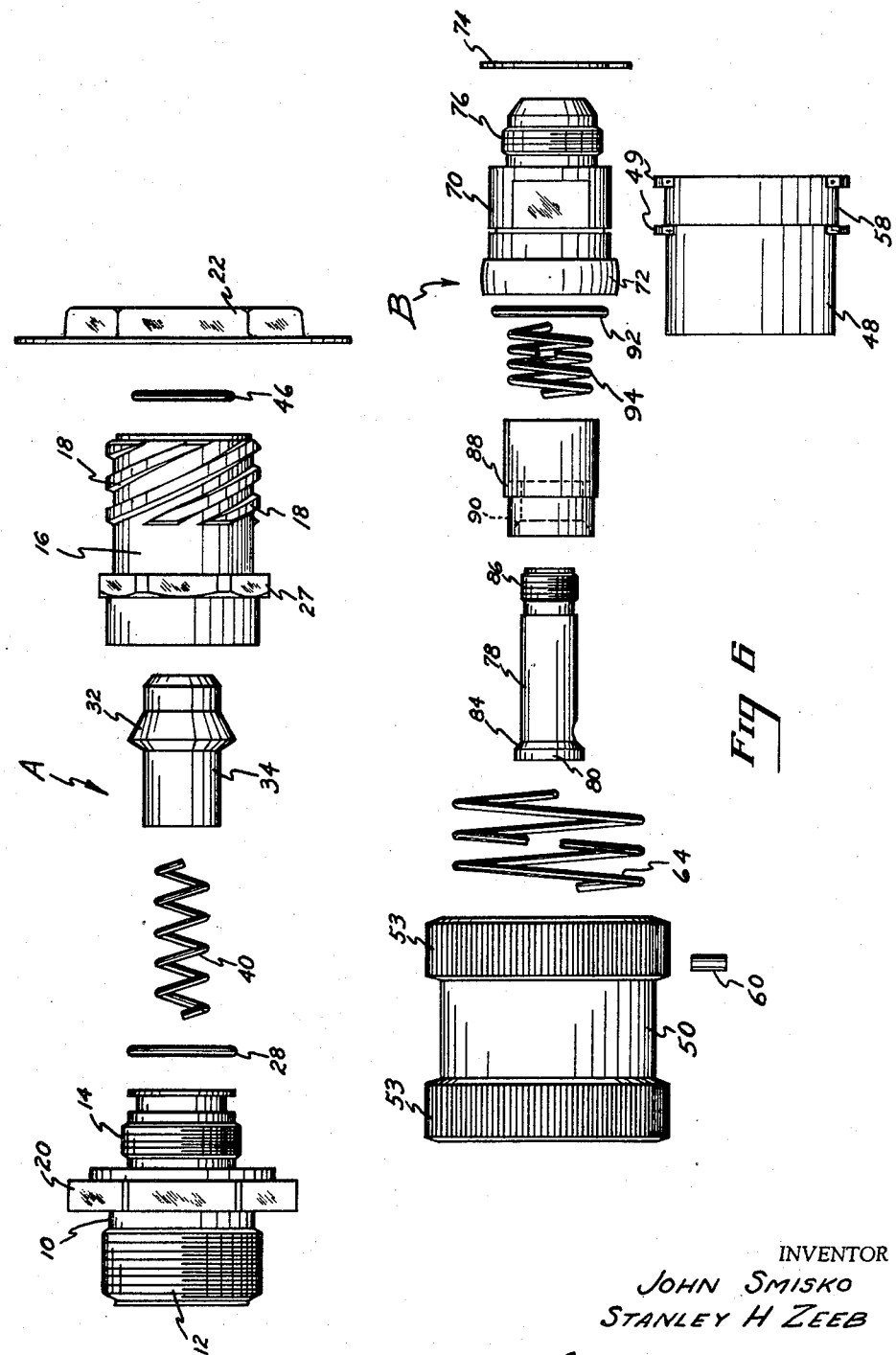

2,934,359

LOCKING STRUCTURE FOR SELF-SEALING COUPLING

John Smisko and Stanley H. Zeeb, Jackson, Mich., assignors to Aeroquip Corporation, Jackson, Mich., a corporation of Michigan Application January 31, 1957, Serial No. 637,440

4 Claims. (Cl. 284—19)

This invention relates to self-sealing couplings and in particular to structure for actuation to connect and disconnect the coupling halves and to lock the same secure upon connection of the coupling halves. Reference to "halves" covers the two coupling parts involved to make a coupled connection for the transfer of fluid through a thus connected pipe or hose line. Said coupling parts comprise valve structure which automatically operates to open or close the coupling halves to the flow of fluid upon connection and disconnection of the coupling halves, respectively.

Hitherto, it has been the custom to employ a rotary nut-like structure for connecting the coupling parts together and for disconnecting the same. This involves a nut or nut-like part on one coupling part which is rotatable to engage teeth on the other coupling part as disclosed, for instance, in U.S. Re-issue Patent No. 23,586 dated November 18, 1952.

An objection to the prior art connector means is that no assurance is given that the coupling parts are fully connected. In actual practice it has been found that the connector nut structure has not been fully tightened, with the result that the coupling parts have been forced apart due to vibration and to some extent to the prevailing forces both of the springs employed in association with the valves in the coupling parts and the internal fluid pressure. This is objectionable, by giving rise to faulty line connections and loss of pressure fluid.

It becomes an important object of the present invention, therefore, to provide for the connection of self-sealing coupling parts by means which preclude an incomplete, or insecure, connection of the coupling parts.

The connector means of the present invention involves a movement and condition in one direction in which the forces within the coupling parts constantly operate to force the same apart until a point is reached at which another movement and condition obtains at which said forces are overcome and the coupling parts are firmly secured together. Until said point is reached connection of the coupling parts is not made, to the extent that if an operator rotating the connector part should let go of the same it will automatically spring away from the other coupling part so that both parts become free.

Another object of the invention is to ensure that when said point is reached the connector part will automatically and immediately move to the locking position, in which said forces are overcome and the coupling parts are firmly secured against separation unless the connector part is deliberately actuated in the reverse direction to disconnect the coupling parts.

Yet another object of the invention is to provide that when the coupling halves have been fully secured together the parts thereof, including in particular the valve parts, will be held "solid" and are thus precluded from being forcibly moved.

The above and other objects and advantages of the invention, residing in the construction, arrangement and combination of parts will become clear, or apparent, upon consideration of the following description of one practical form of the invention, by way of example, with reference to the accompanying drawings and from consideration of the appended claims.

In the drawings:

Fig. 1 is a half longitudinal elevational and sectional view of said one form of the invention with the coupling halves aligned ready for connection with the valves in the closed position, Fig. 2 is a view similar to Fig. 1 but showing the coupling halves partially connected and the valves still closed, Fig. 3 is a view similar to Fig. 1 but showing the coupling halves fully secured and the valves open, Fig. 4 is an end elevational view looking in the direction of the arrows IV—IV in Fig. 2, Fig. 5 is an end elevational view looking in the direction of the arrows V—V in Fig. 2, and Fig. 6 is an exploded view of the coupling halves, the upper portion of the figure showing one of the coupling halves exploded and the lower portion showing the other coupling half exploded.

In the drawings A and B indicate, generally, two separable parts of what has become known as a self-sealing coupling in that each coupling part includes self-sealing valve structure which opens and closes to control the flow of fluid through the coupling parts upon the said parts being connected or disconnected, respectively.

Coupling part A comprises a hollow cylindrical part 10 having an externally screw-threaded portion 12 at one end for the connection of a fluid conductor line or hose (not shown) and, at its opposite end, an externally screw-threaded portion 14 with which a hollow bolt-like part 16 is connected. Part 16 is referred to as a "bolt-like part" since it is formed with external thread or track means 18 which, for quickness of action, is disclosed as being in the form of quick-action spiral threads, shown clearly in Fig. 6. These threads also provide for a rotary connection of the coupling halves with a mechanical advantage.

Part 10 is also formed with an external squared flange 20 with which a correspondingly squared retainer cap 22 engages to hold the coupling part A non-rotatably secured in position, as upon a panel or bulk-head indicated at 24 and by, for example, screw-bolts 26. Part 16 is also formed with an external squared locking flange 27. The term "squared" is used in a broad sense to cover a flat sided figure, such as a hexangonal figure of nut-like form. Actually, the invention depends upon the use of matable surfaces which when brought into mating relation will mate and arrest relative rotation. A seal or O-ring 28 within an annular recess on the part 10 maintains a fluid seal with respect to the bolt-like part 16, which part 16 is formed with an interior bevelled annular surface 30 at the end thereof adjacent the thread or track 18. A correspondingly bevelled surface 32 on the head part of a movable mushroom-type valve 33 is engageable with said surface 30 to close this end of the coupling part A with respect to circumferentially disposed fluid flow ports 36 in the said valve and the interior of the part 10 in the closed conditions of said coupling part 10. Said valve has a sleeve part 34 axially slidable with respect to the bore surface 38 of the part 10. The valve 33 is normally urged to closed position by spring action, shown as effected by a coil spring 40 held at one end against an internal shoulder 42 on part 10 and, at the opposite end, against the inturned end portion 44 of the valve sleeve part 34. A seal or O-ring 46 maintains a fluid seal between the valve head and the adjacent end of the bolt-like part 16.

Coupling part B comprises a two-part sleeve structure formed by an inner nut-like part 48 and an outer sleeve part 50. The part 48 has internal threads 52 (Figs. 1, 2, 3 and 5) engageable with, and shown engaged with, the threads 18 on the said bolt-like part and at its outer end (seen at the right in the drawings) has an internal flange 54, an external flange 56 and an external annular recess 58 in which recess pin means 60 on the outer sleeve part 50 engage. Recess 58 forms an axial guide track for the said pin means, the relative axial travel of which with respect to the track is limited by the external flange 56 and a similar flange 62 on the nut-like part 48. A coil spring 64 (which is stronger than spring 40) mounted between said flange 62 and a shoulder 66 on the sleeve part 50 constantly urges the flange 62 against the pin means 60 as seen in Figs. 1 to 3. Part 48 also has diametral lugs 49 engaged in corresponding recesses 51 in the sleeve part 50. The engagement of these lugs in said recesses constrains the parts 48 and 50 to partake of relative axial motion when the sleeve part 50 is subjected to a rotary force. The knurled portions 53 on the sleeve part 50 facilitate the application of said rotary force by hand by an actuator.

The outer sleeve 50, at its end adjacent the squared flange 27 on the bolt-like part 16 of the coupling part A, is formed with a correspondingly squared recess 68, whereby the flange 27 and recess 68 can be made to have mating engagement as seen in Fig. 3. This mating engagement is what effects the actual locking of the two coupling halves together.

Coupling part B also comprises an adaptor sleeve part 70 held axially secured but rotatable with respect to the nut-like part 48 by the engagement of an external flange 72 of sleeve part 70 behind said flange 54 on the nut-like part and by the retaining clip 74. A screw-threaded end portion 76 of adaptor part 70 serves for the connection of a fluid flow line or hose (not shown). Mounted within the nut-part 48 and the adaptor part 70 there is a valve structure composed of a plug-like element having a hollow stem portion 78 and a head portion 80 having a series of circumferentially arranged ports 82 (one of which is seen in Figs. 1–3) and a bevelled annular surface portion 84. This plug-like valve element is fixed into the bore of the adaptor part 70 by engagement of the screw-threading 86. Said valve structure also comprises a sleeve 88 having a bevelled interior end surface 90 engageable with said bevelled surface 84 and mounted for axial sliding motion with respect to the adaptor 70 and the plug-like valve element. A seal or O-ring 92 maintains a fluid seal between the sleeve 88 and adaptor 70. A coil spring 94 constantly urges the valve sleeve 88 to closed position with respect to the plug-like valve part, in which position the bevelled surfaces 84 and 90 are engaged and fluid flow from the valve ports 82 is cut-off.

*Operation*

In operation and referring first to the position of the parts seen in Fig. 1, the coupling halves A and B are in axial alignment and the lead ends of threads 52 are just engaged with the entry ends of threads 18. In this condition seal ring 46 is immediately effective as a seal. In addition spring 40 urges the valve 33 to its closed position and spring 94 also urges sleeve 88 to its closed position. In their closer positions, flat opposed end surfaces of the valves, in a known manner, contact each other to preclude an air space therebetween and the fluid flow ports 36 and 82 are closed. With the parts positioned as seen in Fig. 1, rotation of sleeve 50 will, by the presence of pin means 60 and lugs 49, produce relative axial motion between the sleeve 50 and its inner nut-like part 48 and be attendant with compression of spring 64 and travel of the pin means 60 in groove 58 as the nut-like part is rotated with respect to the bolt-like part 16. As this rotation proceeds, the valves, while still engaged at their opposed ends, will move as a unit to the left, as viewed in the drawings and will compress valve spring 40 as the squared recess 68 on the sleeve 50 advances axially upon the squared flange 27. Spring 40, therefore, acts constantly with increasing pressure against the valves, and hence the nut and sleeve assembly 48, 50 such that while squared parts 27 and 68 are disengaged (as in Fig. 2) release of the sleeve 50 by the operators will immediately produce a disconnecting movement of the nut-like part 48 with respect to the bolt-like part 16. Thus, if an operator holding onto sleeve 50 to advance the same to the position seen in Fig. 2 should let go of the sleeve, or release his rotative force thereon, the forces of the springs 40 and 94 would immediately become operative to force the sleeve 50 and its nut-like part 48 to unscrew from the bolt-like part 16.

With the parts as seen in Fig. 2, continued rotative force on the sleeve 50 for connecting the coupling halves will eventually bring the squared recess 68 into mating relation with the squared flange 27. Immediately upon this happening, compressed spring 64 is free to cause the sleeve 50 to spring suddenly to fully engage the recess and flange, as seen in Fig. 3. The axial motion which takes place as recess 68 traverses the entire axial extent of the flange 27 establishes a connection between flange 27 and sleeve 50 which is sufficient to secure, or lock, the two coupling parts together.

In order that the present coupling construction can function as above stated it is important that the number of the leads on the threads 18 and 52 should equal the number of flats on the recess 68 and the flange 27. Otherwise the mating engagement referred to will only take place in one relative position of the flat surfaces involved. However, if there are six thread leads and six flats then this gives six positions of mating locking engagement. It is also important that the leads and the flats should be so co-related that when the flats are brought into coincidence the flange 72 of adaptor part 70 is in contact with the opposed end of the bolt-like part 16 (as seen in Fig. 3). The valves are then fully open and the parts thereof are held "solid."

Having thus described the invention what we claim and wish to protect by Letters Patent is:

1. In a coupling having male and female members, the male member being in the form of an externally threaded bolt portion and the female member being in the form of an internally threaded nut portion cooperable with said bolt portion, a locking element axially slidably mounted on said nut portion and fixed against relative rotation thereto, a locking member upon said bolt portion, and locking member engaging means defined on said locking element engageable with said locking member only upon relative rotation of said bolt and nut portions to fully couple said coupling members whereby said nut and bolt portions are restrained against relative rotation by engagement of said locking element with said locking member.

2. In a coupling as in claim 1 wherein said locking member is in the form of a non-circular flange concentrically affixed to said bolt portion, said locking element comprises an annular sleeve mounted on said nut portion and said locking member engaging means comprises a recess defined in said sleeve complementary in configuration to said flange.

3. In a coupling as in claim 2 wherein spring means are interposed between said sleeve and nut portion and axially bias said sleeve relative to said nut portion toward the bolt receiving end of said nut portion.

4. In a coupling as in claim 1 wherein said male and female members include biasing means tending to separate the members upon interconnection, the threads of said nut and bolt portions being of the quick release type whereby the biasing means of said members will rotate and disengage said nut portion from said bolt portion upon disengaging said locking element from said locking member.

References Cited in the file of this patent

UNITED STATES PATENTS

| | | |
|---|---|---|
| 2,441,363 | Krueger | May 11, 1948 |
| 2,485,006 | Main et al. | Oct. 18, 1949 |
| 2,504,569 | Murphy et al. | Apr. 18, 1950 |
| 2,643,140 | Scheiwer | June 23, 1953 |
| 2,706,646 | Olson | Apr. 19, 1955 |
| 2,730,380 | Espy et al. | Jan. 10, 1956 |
| 2,828,978 | Wurzburger | Apr. 1, 1958 |